United States Patent
Eberlein et al.

(10) Patent No.: US 10,891,217 B2
(45) Date of Patent: Jan. 12, 2021

(54) OPTIMIZING TEST COVERAGE BASED ON ACTUAL USE

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 15 days.

(21) Appl. No.: 16/214,724

(22) Filed: Dec. 10, 2018

(65) Prior Publication Data
US 2020/0183812 A1   Jun. 11, 2020

(51) Int. Cl.
*G06F 11/36* (2006.01)
*G06F 17/18* (2006.01)

(52) U.S. Cl.
CPC ...... *G06F 11/3676* (2013.01); *G06F 11/3664* (2013.01); *G06F 11/3684* (2013.01); *G06F 11/3688* (2013.01); *G06F 17/18* (2013.01)

(58) Field of Classification Search
CPC .................................................. G06F 11/3676
USPC ........................................................ 717/124
See application file for complete search history.

(56) References Cited

U.S. PATENT DOCUMENTS

| | | | |
|---|---|---|---|
| 5,680,573 A | 10/1997 | Rubin et al. | |
| 5,925,100 A | 7/1999 | Drewry et al. | |
| 5,946,647 A | 8/1999 | Miller et al. | |
| 6,055,569 A | 4/2000 | O'Brien et al. | |
| 6,728,726 B1 | 4/2004 | Bernstein et al. | |
| 6,996,680 B2 | 2/2006 | Mogi et al. | |
| 7,284,096 B2 | 10/2007 | Schreter | |
| 7,523,142 B2 | 4/2009 | Driesen et al. | |
| 7,529,895 B2 | 5/2009 | Blumrich et al. | |
| 7,558,822 B2 | 7/2009 | Fredricksen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,894,602 B2 | 2/2011 | Mueller et al. | |
| 7,941,609 B2 | 5/2011 | Almog | |
| 7,962,920 B2 | 6/2011 | Gabriel et al. | |
| 7,971,209 B2 | 6/2011 | Eberlein et al. | |
| 8,126,919 B2 | 2/2012 | Eberlein | |

(Continued)

OTHER PUBLICATIONS

U.S. Appl. No. 14/960,983, filed Dec. 7, 2015, Eberlein, et al.

(Continued)

*Primary Examiner* — John Q Chavis
(74) *Attorney, Agent, or Firm* — Fish & Richardson P.C.

(57) ABSTRACT

Implementations of the present disclosure include methods, systems, and computer-readable storage mediums for test optimization based on actual use of configuration parameters. Actions include receiving a parameter set from a monitoring system, the parameter set including multiple configuration parameters corresponding to development artifacts detected by the monitoring system, retrieving statistical data from a central data analysis infrastructure, the statistical data being retrieved from application systems executing software created out of the development artifacts, processing the parameter set using the statistical data to generate parameter clusters, and providing the parameter clusters to an integrated development environment to generate a test scope proposal based on the parameter clusters.

17 Claims, 4 Drawing Sheets

(56) References Cited

U.S. PATENT DOCUMENTS

| | | |
|---|---|---|
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 9,724,757 B2 | 8/2017 | Barrett |
| 2004/0117398 A1 | 6/2004 | Ldei et al. |
| 2006/0069715 A1 | 3/2006 | Vayssiere |
| 2006/0098253 A1 | 5/2006 | Masuno et al. |
| 2008/0120129 A1 | 5/2008 | Seubert et al. |
| 2010/0023925 A1 | 1/2010 | Shribman et al. |
| 2010/0153341 A1 | 6/2010 | Driesen et al. |
| 2011/0054643 A1* | 3/2011 | Law .................. G05B 23/0256 700/79 |
| 2012/0030651 A1* | 2/2012 | Kemmler ............ G06F 11/3688 717/124 |
| 2012/0089664 A1 | 4/2012 | Igelka |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klennenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2016/0050108 A1* | 2/2016 | Baughman .......... G06F 11/3457 709/220 |
| 2017/0075668 A1* | 3/2017 | Selvi ................. G06F 8/447 |
| 2017/0115971 A1* | 4/2017 | Pamer .................... G06F 8/437 |
| 2018/0052682 A1* | 2/2018 | Fox .......................... G06F 8/751 |
| 2018/0349159 A1* | 12/2018 | Boutnaru ............ H04L 67/1004 |
| 2018/0349256 A1* | 12/2018 | Fong .................... G06N 3/0454 |
| 2018/0351652 A1* | 12/2018 | Ashrafi .................. H04L 41/08 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer
U.S. Appl. No. 15/356,190, filed Nov. 18, 2016, Eberlein, Peter.
U.S. Appl. No. 15/461,236, filed Mar. 16, 2017, Richter et al.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.
U.S. Appl. No. 16/173,225, filed Oct. 29, 2018, Eberlein et al.
U.S. Appl. No. 16/197,888, filed Nov. 21, 2018, Meissner et al.
U.S. Appl. No. 16/208,920, filed Dec. 4, 2018, Eberlein, et al.

* cited by examiner

OPTIMIZING TEST COVERAGE BASED ON ACTUAL USE

BACKGROUND

For systems with a large set of configuration parameters, the number of possible (and even the number of meaningful) combinations of parameters and situations that determine which code segment(s) to execute, and with which parameters, are countless. Establishing tests for all (or substantially all) possible combinations of parameters and situations can be based on configuration combinatorics. Configuration combinatorics are countless, thus testing all combinations involves high computing costs. In some cases, a portion of the combinations, might not be used or planned to be used. The question is thus, which combinations are not relevant to test. This is especially true because the non-relevant tests could lead to "false positive" signals, as developers would try and solve problems for particular scenarios, which are neither meaningful nor useful.

SUMMARY

The present disclosure describes techniques for analyzing and associating statistical data that is associated with configuration parameters for optimizing test coverage.

In an implementation, a parameter set that provides test optimization for configurations of a production system is received from a monitoring system. The parameter set includes a plurality of configuration parameters corresponding to development artifacts detected by the monitoring system. Statistical data is retrieved from a central data analysis infrastructure. The statistical data is retrieved from application systems executing software created out of the development artifacts. The parameter set is processed using the statistical data to generate parameter clusters. The parameter clusters are provided to an integrated development environment to generate a test scope proposal based on the parameter clusters.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, implementations of the present disclosure include a modification of a system configuration to provide clustered configuration parameters for a system to be tested in an environment, where a change is created, thereby reducing errors, as well as reducing an amount of maintenance (for example, human input). In some examples, maintenance can be reduced by triggering automated procedures to identify and to update relevant configuration parameters for a test environment, and to transport the updated configuration parameters to a production environment. Second, a disclosed data analysis and association system allows production insight data to be correlated with software code analysis to recommend software code improvement(s). Under the described approach, developers can be provided with new insights to create superior software code, and supported to require less iterations to write "good software code." Third, not all configuration parameters are copied for testing. Using the described implementation enhances time and resource management, such that a need to transmit and store large amounts of configuration parameters (for example, terabytes (TB) in one or more databases) is foregone. Fourth, the disclosed system enables planning of the test coverage for an application, increasing coverage for relevant portions and skipping tests for combinations of irrelevant configuration parameters, which reduces overall computational costs. Fifth, database size needed for configuration parameters used in testing remains constant (or substantially constant) because configuration parameters that have already been tested are automatically replaced by relevant configuration parameters that have not already been tested. Sixth, a 100% test coverage for configuration combinations is not practically possible. The system allows optimization of most relevant configuration combinations to be tested along usage by consumer and change by the vendor.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
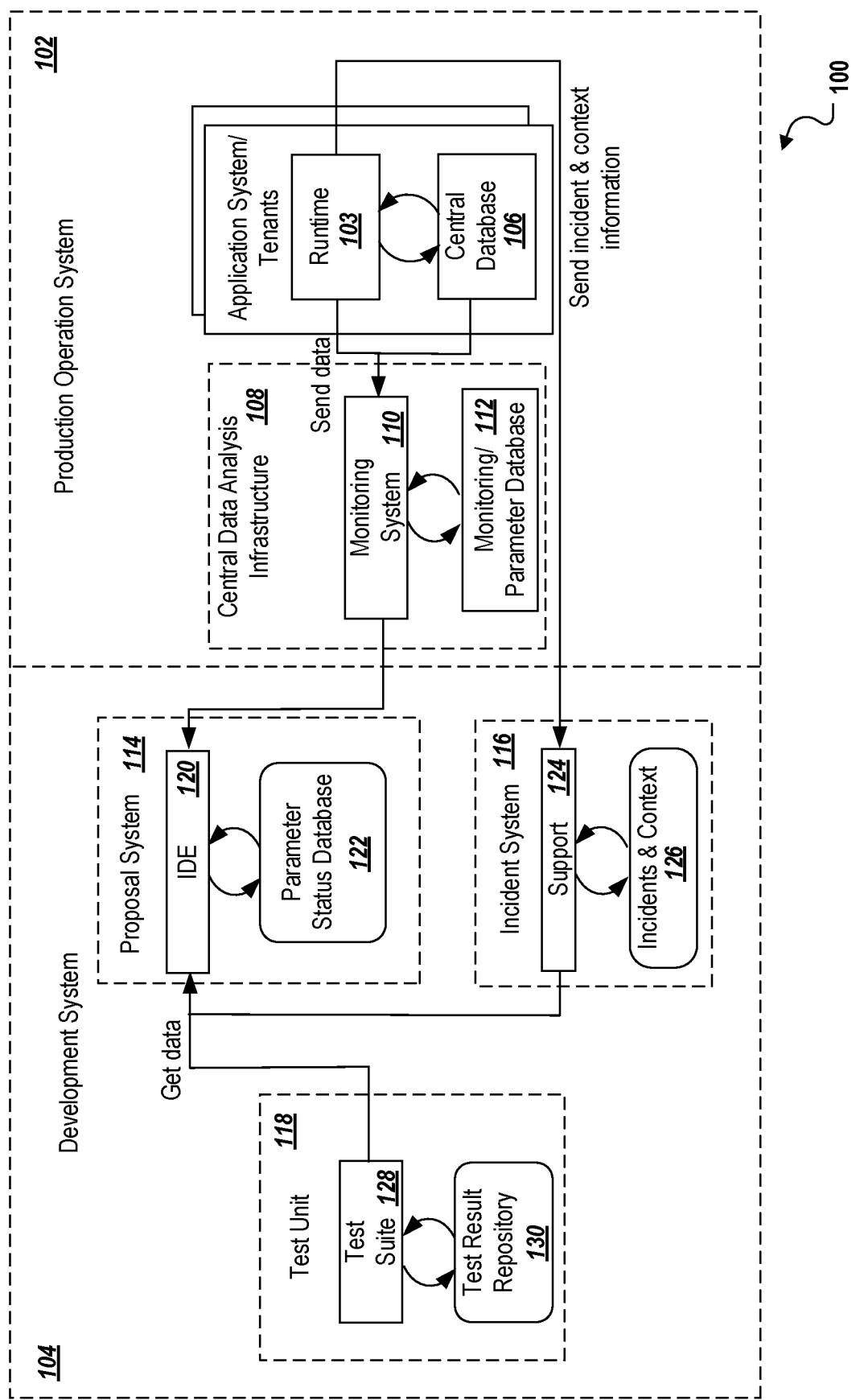
FIG. 1 is a block diagram illustrating component/data relationships for an enhanced integrated development environment (IDE) framework that employs a real-time data analysis and association system, according to an implementation of the present disclosure.

The following detailed description describes techniques for performing analysis and optimization of configuration parameters in an integrated development environment (IDE) and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

IDEs are software packages that provide comprehensive support to developers, such as for coding, testing, and debugging. IDEs can assist developers with managing their development projects through a single dashboard with functionalities such as syntax highlighting and aid in editor; documentation look-up; flexible and configurable build support, and packaging and deployment options. Most modern IDEs offer intelligent software code completion features. However, software code insight is one of the most helpful tools that an IDE can provide, and is the ability for the IDE to interpret what is entered (for example, typed). Another feature of modern IDEs is the ability to debug software code. Since testing (for example, debugging, function testing, and load testing) is one of the most important tools with respect to deploying a successful software program (or application) based on the software code, testing provides developers with an ability to execute (or run) software programs, stop the software program execution at specified points to check values of variables or other data as needed, and to verify that the software program and associated functions are executing as intended.

Several problems exist with modern IDE functions. First, for example, with modern IDEs, developers are often provided limited insights into ultimate use of their software program. As understood by those of ordinary skill in the art, production use of a software program can differ from testing use of the software program, especially with some applications of a software program, which can deal with massive request loads and data volume in production use within a production environment. In these instances, testing environments can fail to adequately simulate real-world-type operations. As a result, developers face a challenge in that it is difficult to assess an impact of changes in a software program with respect to actual operational use(s).

Further, under modern IDE frameworks, developers are required to look for information regarding software programs in several places if they wish to receive information regarding how developed software code is applied in the software programs. For example, to analyze software code operations and to collect relevant configuration parameters, developers typically have to work through other computer infrastructures by searching for configurations and mapping the configurations to a created software code artifact. Such a process is cumbersome and requires additional actions from the developers. Because configuration parameters are available only if the developers actually search for the configuration parameters, their analysis is often skipped as unnecessary or simply due to a lack of time or other resources.

Additionally, modifications of an IDE are associated with modifications of configuration parameters. The modified configuration parameters transmitted to applications, to services and to a database have impact on the executing code. Applications are a composite, not only of code, but also of configuration(s), database content, and calls for external services. Test coverage for applications is a combination of "code coverage" and "configuration coverage." In some implementations, a configuration can define the processes to execute for particular locations (for example, countries) or industries. Individual requirements of a customer with respect to process definitions can be configured using configuration parameters. Typically, configurations are not independent, such that "verticalization and globalization" can become a major problem with respect to scope. Existent software can be reconfigured to be enabled for additional countries and additional industries (for example, according to country specific legal constraints, habits, or client preferences). As will be understood by those of ordinary skill in the art, possible configuration combinations are countless. For example, a database can store tens of thousands of configuration parameters. Even though not all configurations are dependent within one end-to-end process, there still are countless possible configuration combinations. As another example, a human resources configuration can be configured to be independent of a logistics configuration within one end-to-end process (such as, an order to cash or to sell from stock). However, considering the large number of possible configuration parameters and their interdependencies, comprehensive coverage of the possible configurations is not practically achievable. Techniques for configuration testing can identify relevant parameters to define an optimal collection of configuration parameter sets to efficiently use available resources allocated to test runs.

Described is a configuration parameter analysis and association system with an enhanced IDE that can provide additional information from executing software programs which can be used to simplify and to optimize software testing and to enable creation of better software code with less overall iterations. Here, "better" is used in the sense of improved performance, less computing resource usage, easier to extend, and less impactful with respect to a software change to a production environment. The described solution takes into account both design-time data and production/runtime data, and the information is obtained directly from a context in which software developers are working. The described subject matter can: 1) provide configuration incidence information to a software developer by providing insights in a configuration usage, frequency, and relevance, so that the information can be accessible for the software developer directly in the development tool used to create the software code, instead of through a second computing infrastructure and 2) can be used to derive and to present recommendations for better software configuration by analyzing configuration parameter clusters and software code insights. In this way, a software developer can work with extended knowledge about configurations of an application to improve the application.

FIG. 1 is a block diagram illustrating component/data relationships for an enhanced IDE framework 100 that employs a real-time configuration parameter analysis and association system, according to an implementation of the present disclosure. FIG. 1 is provided for example purposes only to enhance understanding of the presented concepts. As will be appreciated by those of ordinary skill in the art, there are a myriad of possible ways to present or to arrange the presented components, to structure their interactions, or to describe inter/intra-component interactions/communications. In as far as they are consistent with this disclosure, the other possible presentations or arrangements, structures, or descriptions are considered to be within the scope of this disclosure.

At a high-level and in some implementations, the described enhanced IDE framework 100 includes a production operation system 102 and a development system 104. The production operation system 102 (for example, application systems or tenants executing software) is used to collect (for example, through runtime central data collection 103) and to store data associated with configuration parameters associated with development artifacts for further processing and analysis. In some implementations, the data is collected by a monitoring agent reading data from operating system, database (for example, an in-memory database such as SAP HANA), and an application server (for example, SAP ABAP). The database and the application server provide monitoring application programming interfaces (APIs) to read/collect statistical data about runtime. For example, an ABAP system can write log entries each time some type of event occurs (such as, when a transaction or a report is called). The ABAP system then can evaluate the log entries in an aggregated form in a system report. The read/collected statistical data is associated with the use of the application systems or the tenants executing the software, and can include, for example, performance data, data volumes, and usage statistics. The statistical data can be collected per application system or tenant, and can be stored centrally in a central database 106. The central database 106 can add information (for example, semantic data) with which the statistical data is related with respect to a particular application system/tenant (for example, by adding an application/system ID to the collected configuration parameter to enable statistical insights regarding tenant usage and incidents).

Statistical data stored in the central database 106 can be further collected and stored in a central data analysis infrastructure 108, where statistical values of the collected statistical data can be calculated. The central data analysis infrastructure 108 can include a monitoring system 110 and a monitoring statistics database 112. The monitoring system 110 can be configured to collect and compute statistical values of the collected statistical data (such as, average/minimum/maximum values of the tenant's usage of an application) to permit generation of data insights associated with the collected statistical data (including configuration parameters). In some implementations, both the collected statistical data and data insights can be stored in the monitoring statistics database 112.

In some implementations, the production operation system 102 is configured to transmit acquired and processed data to the development system 104. The development system 104 can include a proposal system 114, an incident system 116, and a test unit 118. The proposal system 114 can include an enhanced IDE 120 and a parameter status database 122. The incident system 116 can include a support system 124 and an incidents and context database 126. The test unit 118 can include a test suite 128 and a test result (local) repository 130. The test unit 118 can be configured to select an initial set of configuration parameters and to perform a test for the software component using clustered and filtered configuration parameters. The software artifacts called by the initial set of configuration parameters can be known artifacts (for example, the information can be transmitted with the software to the production operation system 102). For the known artifacts, the call parameters are collected during runtime (for example, during critical performance, for selected configurable software modules). The configuration parameters of the incidents associated with known artifacts can be selected (for example, for a call stack and dump, the parameters can be selected from the stack or from a monitoring report). In some implementations, the test unit 118 can be configured to initiate the configuration parameter test without a test unit. For example, configuration parameters can be collected for defined application-programming interfaces (APIs) (for example, API hub or OData services). For configuration parameters collected for defined APIs, the code-coverage can be initially performed. Information to cover the code with identified artifacts can be derived. Used software artifacts can be traced independently of the test unit definition.

In some implementations, the central data analysis infrastructure 108 can be implemented to transmit data to the enhanced IDE 120. In some implementations, the enhanced IDE 120 can access the central data analysis infrastructure 108 and request a data set for a certain development artifact. For example, the central data analysis infrastructure 108 can offer an API (not illustrated in FIG. 1) to permit reading statistical data and corresponding data insights for a particular development artifact associated with particular configuration parameters. In this way, the enhanced IDE 120 can be extended to provide additional views for "configuration insights," which illustrates statistical data related to the development artifact opened in an editor view or a package explorer view.

In some implementations, the enhanced IDE framework 100 communicates with a parameter status database 122 that can be configured to include parameter status data received from the central data analysis infrastructure 108. In this way, the proposal system 114 (for example, a scope planner) can find parameter status data related to the objects shown in the enhanced IDE 120 (for example, identifiers of a parameter status indicating modified configuration parameters, tested or untested configuration parameters) from the parameter status database 122. In some implementations, the configuration can be organized hierarchically including a "process," at least a "module," and at least an "item." Users accessing the proposal system 114 can select "items" and can customize (for example, "fine-tune") them by adding private extensions. The customized items can be activated and customized entries can be created in tables and parameter settings to generate code. The "items" can define the used scope of the configuration. To get the "used customer scope," the activated scope items are collected. In some implementations, the scope items can include the number of customers having the scope item set "active," the number of incidents, relating to the scope item, and the information if the scope item is changed. The scope items can also be grouped into sets. Scope item sets can include the number of customers using a certain scope item set, the number of incidents relating to a scope item set, scope item clusters determined by the clustering algorithms on used sets and sets in incidents. The development can be provided with statistical information, such as: "item 1—used 1834 times," "item 2—used 1733 times," and "item 3—used 1522 times." Customers can use a combination of items. For example, a first customer can use a first group of items including a first, a second and a third item (for example, item 23, 24, and 55); a second customer can use a second group of items that partly overlaps with the first group of items, including a second, a third item, and a fourth item (for example, item 23, 24, and 56); a third customer can use a third group of items that partly overlaps with the first and second groups of items, including a second, a third item, and a fifth item (for example, item 23, 24, and 57).

The test unit 118 can be used to identify subsets of used items (for example, 23 and 24) common to multiple customers. The test unit 118 of the development system 104 can be provided with statistics on common sub-sets and additionally ideally with all sets (if feasible from a volume and a privacy perspective). In some implementations, the test unit 118 that includes tested configuration parameters can push corresponding development artifacts to the IDE 120 and to the parameter status database 122, so the development artifacts stored in the parameter status database 122 are synchronized with the optimized configuration parameters. As such, the central data analysis infrastructure 108 can collect statistical data for the related configuration parameters as well and transmit the statistical data to IDE 120. In this way, the proposal system 114 can optimize configuration parameters and provide insights into the configuration parameters by combining the statistical data with the configuration parameters. In some implementations, the IDE 120 can read the collected statistical data and configuration parameters, and then use different algorithms to determine configuration optimization based on the statistical data and the parameter status retrieved from the parameter database 122. In some implementations, the algorithms used for this purpose can be generic algorithms (for example, clustering algorithms), which are not necessarily designed explicitly for the described use case(s). In some implementations, the algorithms can also be "expert algorithms", which are created for a certain use case, and integrated with expert knowledge (for example, algorithms used to relate deployment runtime to parameter characteristics and to change the configuration parameters to provide an optimized configuration). These algorithms can either be exposed directly to the IDE using an API or be used to compute the data to return on a request, or the algorithms can be configured to generate software code or a library parametrization, so that the IDE can access the generated software code with an API provided to the IDE. In other words, the algorithm can be used by the IDE to optimize configurations upon a request or to generate software code so that the IDE can access the software code through an API. In some implementations, the test result repository 130 can be configured to store configuration parameters that were tested and optimized, so that the production operation system 102 can download and deploy the optimized configuration parameters to correlate with collected statistical data within production operation systems 102.

Figure 2:
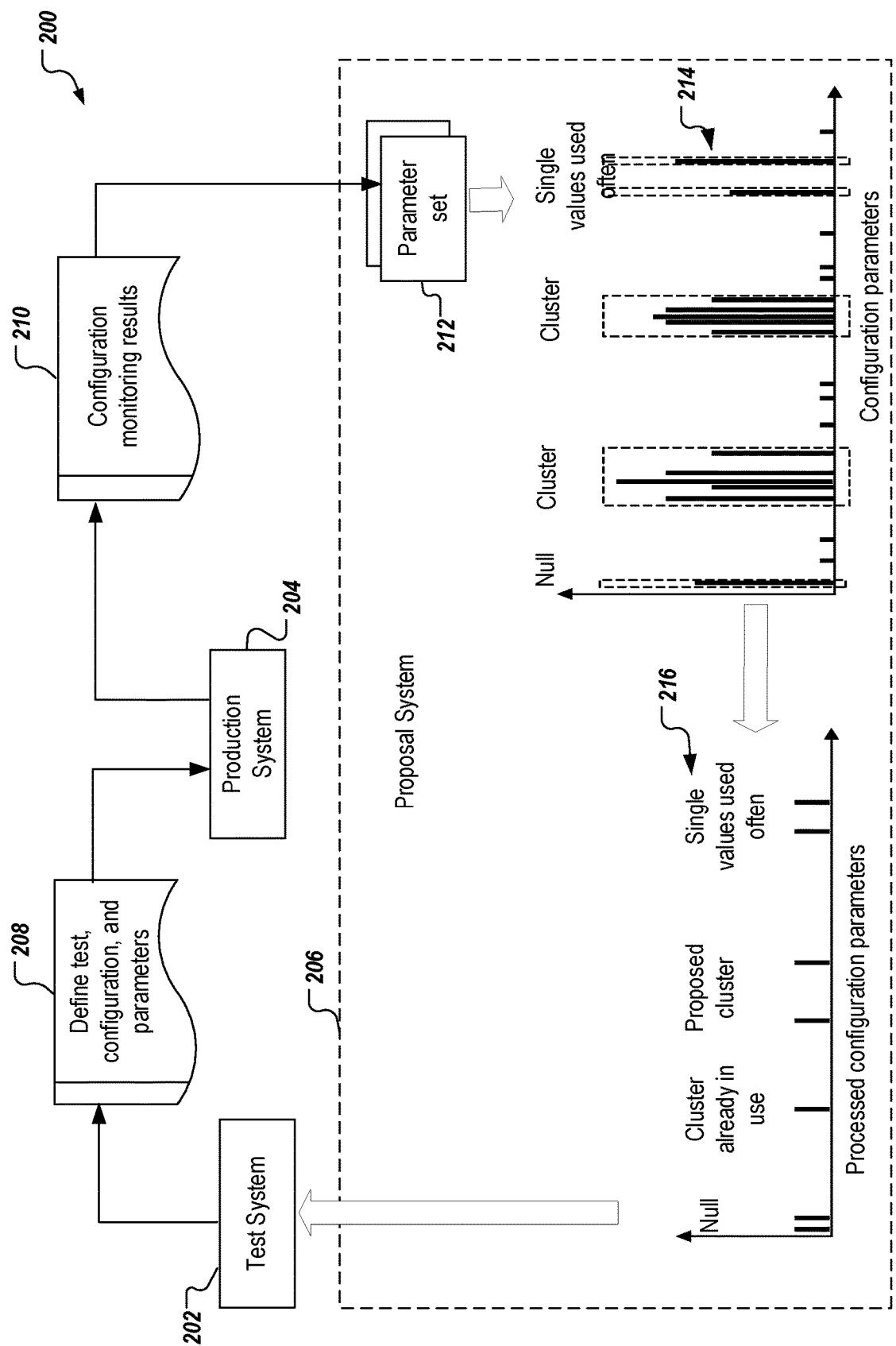
FIG. 2 is a block diagram of example of a configuration optimization landscape, according to an implementation of the present disclosure.

FIG. 2 schematically depicts an example configuration optimization schema 200. The example configuration optimization schema 200 can include a test system 202, a production system 204, and a proposal system 206. The test system 202 can be configured to define a configuration optimization workflow within the example configuration optimization schema 200, to call configuration parameter identification and optimization tools. For example, a developer can create a user input 208 to define test, configuration parameters, and to initiate a configuration optimization process.

The test system 202 can generate a signal that triggers the production system 204 to execute software, to mark incidents, and to export a configuration monitoring result 210. The configuration monitoring result 210 can include data indicating incidents associated to particular configuration parameters. For example, the configuration monitoring result 210 can include an identifier of a configuration for a process calling a modified model, a custom code to be used in the new process, configuration data, the model configuration data, and a parameter set (for example, to be used for optimization). The configuration monitoring result 210 can include a call-stack that has a significant size. Every program calling another program passes parameters. The production system 204 can be configured to perform monitoring functions to collect parameters for "to be monitored" functions. The production system 204 can be configured to collect data from the system on the collected parameter set (for example, once in a selected number of days the data acquired during the set time). The production system 204 can be configured to stores parameter data with attribute to allow mapping to software function. The production system 204 can be configured to select configuration parameters, which are relevant for system monitoring and analysis. For example, production system 204 can be configured to select the parameters associated with the modules, which are called by the test units of the test system 202.

The proposal system 206 can receive at least a portion of the configuration monitoring result 210 including the parameter set 212 from multiple production systems 204. The proposal system 206 can be configured to call data clustering components to determine clustering results. For example, the proposal system 206 can process the parameter set 212 to identify groups of parameter types 214, such as null parameters, cluster parameters, and single parameters. In some implementations, the groups of parameter types 214 can be determined using statistical information indicating the frequency of use of each item of a configuration (for example, "item 1—used 1834 times", "item 2—used 1733 times", "item 3—used 1522 times"). Statistical information on usage ranking or percentages can be used in a cost function to compute a ranking for each configuration item, which enables identification of the configuration items that are relevant for testing. The proposal system 206 can process the groups of parameter types 214 to generate clustered and filtered parameters 216. For example, configuration parameter cluster already in use can be differentiated from new (proposed) configuration parameter cluster. In response to retrieving and selecting the relevant parameters from customer usage and customer incidents, the proposals for parameters can be derived: vendor test unit parameters are read/captured; customer usage parameters are monitored/captured; parameters associated with the customer incident are compared to vendor test unit parameters and customer usage parameters to identify differences. If there are additional parameters or parameter ranges in the group of customer incidents, the additional parameters are added to the vendor test coverage.

In some implementations, the proposal system 206 can be configured to process incident data (incident report) to determine an incident scope. The incident report can be mapped to software module and configuration. In some implementations, the incident report includes a "call stack" including stack data structure that stores information about the active subroutines of the software module corresponding to the incident. For example, in case of a software module encountered a fatal error leading to an "abort" function, a call stack can be automatically created by the system. The incident report can include a set of software artifacts that relate to different software modules. The incident report can include framework code (related to UI, database) and logic. The software "artifacts" can be bundled in "packages" and the "packages" in "components." Typically, on a "package" or "component" level it can be decided if the artifact is associated with a framework code or logic. For example, the software module related to an application logic can be relevant for optimization of configuration parameters. In some implementations, the incident report can also be created by a customer interacting with a graphical user interface. The incident report can include context information related to the software module presenting a detected artifact. The incident report can include an error message of a certain software module. The error message can include an error code that can be mapped to the software module. In some implementations, the proposal system 206 can use a cost function can be used to define, which aspect of a parameter set and an incident set has the highest priority. The cost function can identify scopes reported in incidents to be tested and can identify changed items, which are frequently by multiple customers to be tested to avoid regression.

The proposal system 206 can transmit the results of the cost function (for example, statistical analysis of the configuration parameters and incident data processing) to the test system 202. The test system 202 can be configured to process known test sets, receive results of clustering components, receive input on new sets (for example, incident, mainstream, changed by vendor), receive input on no longer used configuration sets, receive input on used configuration not previously associated with issues (mainstream without incident) and to generates optimized parameters. The test system 202 can be configured to test the configuration parameters and deploy corrected configuration parameters to optimize a corresponding configuration of the production system 204. The test results provide a list of added and change scope items. Scope items can reflect changed values for many different customizing tables. These values can be changed to provide a new version of a scope item. For changed scope, two scenarios are to be considered: 1) "used" and 2) "new" scope. "Used" is a scope item, which had already been shipped and is used by customers, whereas a "new" scope item is one that has not yet been used by customers (that is, either not shipped or not enabled to use).

Figure 3:
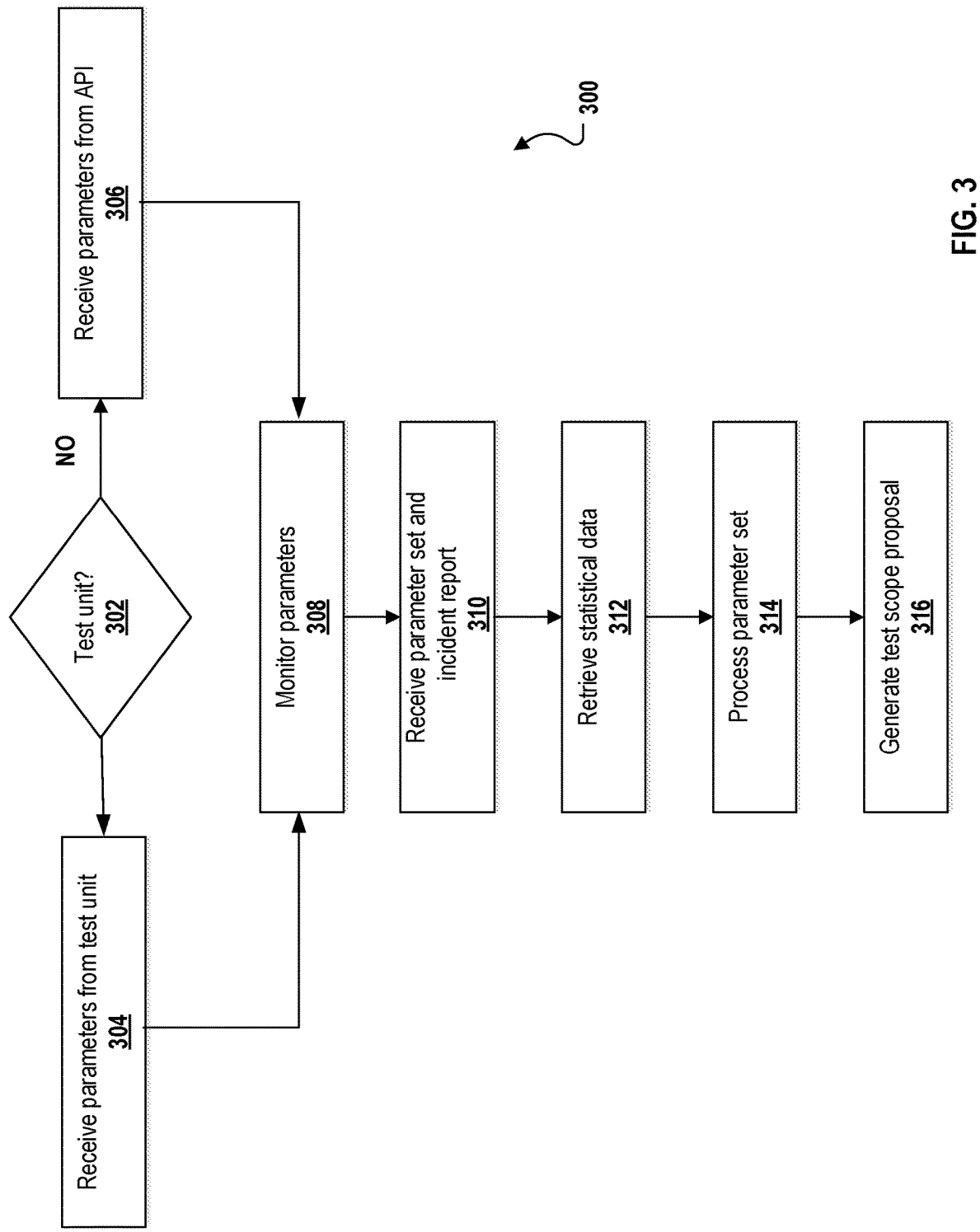
FIG. 3 depicts an example process that can be executed in accordance with implementations of the present disclosure.

FIG. 3 is a flowchart illustrating an example of a computer-implemented method for test optimization based on actual use of configuration parameters, according to some implementations of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be executed in parallel, in combination, in loops, or in any order.

At 302, it is determined whether configuration parameters are retrievable from a test unit. In response to determining that configuration parameters can be retrieved from the test unit, method 300 proceeds from 302 to 304. In response to determining that configuration parameters cannot be retrieved from the test unit, method 300 proceeds from to 306.

At 304, an initial set of configuration parameters is retrieved from the test unit. The initial set of configuration parameters received from the test unit can be associated to known artifacts (for example, critical performance of selected configurable software modules) or can be configuration parameters known to be used by multiple production systems. From 304, method 300 proceeds to 308.

At 306, an initial set of configuration parameters is received from defined application-programming interfaces (APIs). For example, an initial code-coverage can be performed using configuration parameters collected for defined APIs. Information to cover the code with identified artifacts can be derived. Used software artifacts can be traced independently of the test unit definition. In some implementations, a first set of initial configuration parameters is retrieved from the test unit and a second set of initial configuration parameters is retrieved from defined APIs. After 306, method 300 proceeds to 308.

At 308, instruction data is transmitted to a production system to monitor the configuration parameters identified by at least one of the test unit and the APIs. In some implementations, the instruction data includes identifiers of the configuration parameters to be monitored and a monitoring frequency (for example, continuously, hourly, or daily) and a monitoring duration (for example, a selected number of days, weeks, or months). After 308, method 300 proceeds to 310.

At 310, a parameter set and an incident report is received. The received parameter set can be identical or smaller than the initial set of configuration parameters. Each configuration parameter of the received parameter set is both included in the initial set of configuration parameters and is associated with an identified software artifact. The incident report can include data associated with one or more identified software artifacts, software modules, and configurations of the software modules. For example, the incident report can include a "call stack" including a stack data structure that stores information about the active subroutines of the software module corresponding to the incident. In case of a software module encountered a fatal error leading to an "abort" function, a call stack can be automatically created by the system. The incident report can include a set of software artifacts that relate to different software modules. The incident report can include framework code (related to UI, database) and logic. The software "artifacts" can be bundled in "packages" and the "packages" in "components." Typically, on a "package" or "component" level it can be decided if the artifact is associated with framework code or logic. For example, the software module related to an application logic can be relevant for optimization of configuration parameters. In some implementations, the incident report can also be created by a customer interacting with a graphical user interface. The incident report can include a context information related to the software module presenting a detected artifact. The incident report can include an error message of a certain software module. The error message can include an error code that can be mapped to the software module. After 310, method 300 proceeds to 312.

At 312, statistical data associated with the configuration parameters included in the parameter set is retrieved from application systems executing software created from the development artifacts. In some implementations, a central data analysis infrastructure comprises a monitoring system and a monitoring statistics database, and the monitoring system collects statistical data from application systems and stores the collected statistical data to the monitoring statistics database. The statistical data can include a recorded frequency of artifacts associated with each of the configuration parameters included in the parameter set. The statistical data can include a classification of configuration parameters based on severity of artifacts (for example, fatal errors versus warnings). After 312, method 300 proceeds to 314.

At 314, the statistical data is correlated with the parameter set to generate parameter clusters corresponding to configuration parameters relevant for testing (for example, configuration parameters used frequently, by multiple production systems that have not been previously tested). In some implementations, the parameter clusters are automatically generated using clustering algorithms, such as unsupervised linear clustering algorithm (for example, k-means clustering algorithm, fuzzy c-means clustering algorithm, hierarchical clustering algorithm, Gaussian clustering algorithm, or quality threshold clustering algorithm). The parameter clusters can include a null cluster, a cluster corresponding to configuration parameters used by multiple production systems that have not been previously tested, a cluster corresponding to configuration parameters used by multiple production systems that have been previously tested, and a group of frequent single configuration parameters (for example, a unique configuration parameter used by a single production system that frequently produces artifacts). The processing of the configuration parameters can be configured to exclude from the parameter clusters all configuration parameters that are associated to isolated or exceptional artifacts (for example, with an incident frequency below a set threshold). After 314, method 300 proceeds to 316.

At 316, a test scope proposal is generated. The test scope proposal includes filtered parameter clusters defining configuration parameters relevant for testing. For example, parameter clusters can be filtered to propose for testing the configuration parameters used by multiple production systems that have not been previously tested and frequent single configuration parameters (for example, by excluding the null cluster and the cluster corresponding to configuration parameters used by multiple production systems that have been previously tested). In some implementations, the insights of configuration parameter analysis and the generated proposal for testing can be displayed in views of the IDE and used to edit the development artifacts. The configuration parameters in the filtered parameter clusters can be stored in a testing database and can replace old configuration parameters previously tested, such that the size of the database is maintained substantially constant.

In some implementations, the monitoring system determines data insights associated with configuration parameters relevant for testing and development artifacts by end users, and the data insights are determined by calculating statistical values of the statistical data. In such implementations, the monitoring system enhances the efficiency of software testing. After 316, method 300 can stop or (not illustrated) can loop back to 302 or 308.

Figure 4:
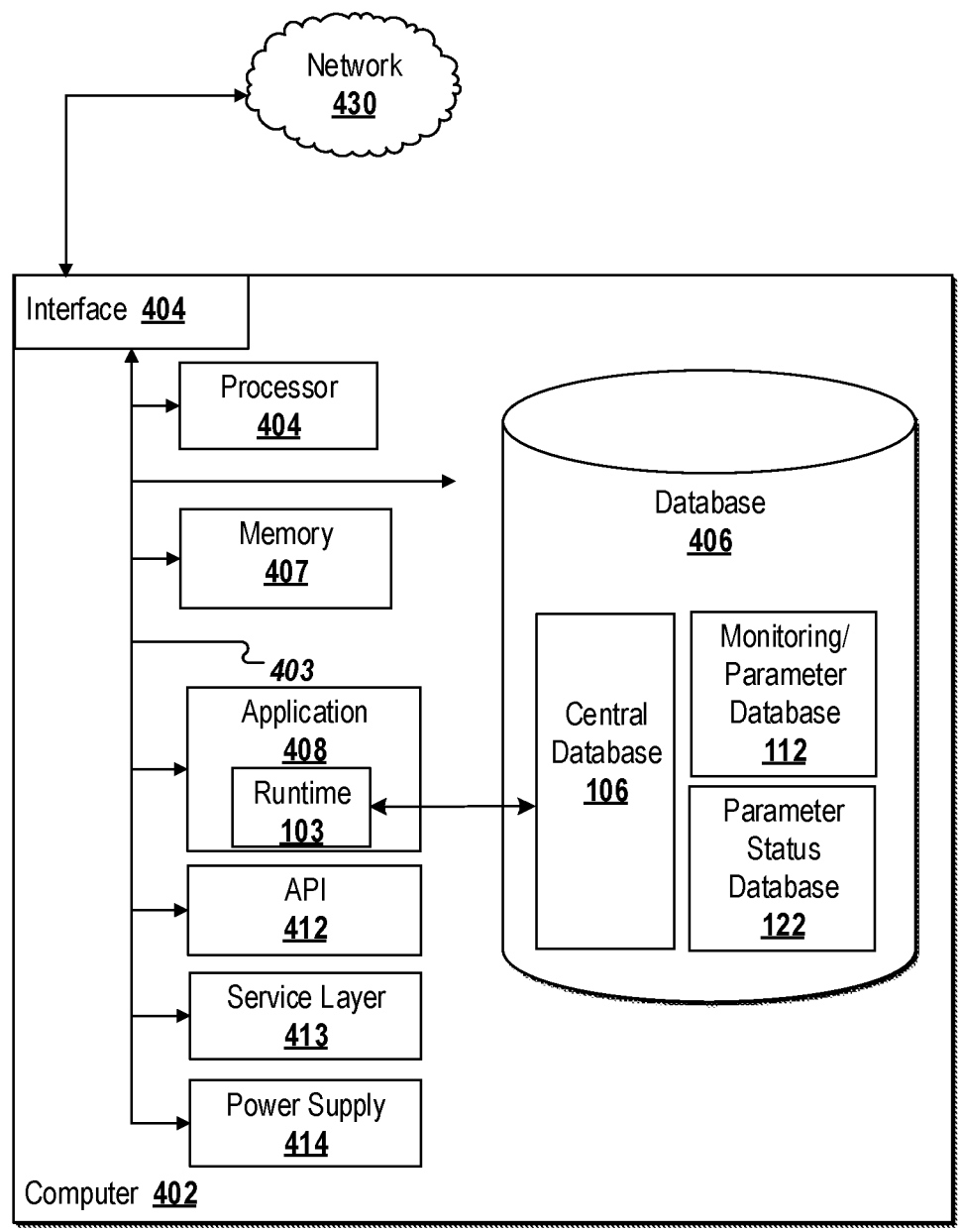
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing image reconstruction as described in the present disclosure. The illustrated Computer 402 is communicably coupled with a Network 430. In some implementations, one or more components of the Computer 402 can be configured to operate within an environment, including cloud computing based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, email server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application-programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, some implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, disk storage, or another type of database storing data consistent with the present disclosure. In some implementations, Database 406 can be a combination of two or more different database types (for example, a hybrid in-memory and disk storage database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in some implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 of similar or differing types can be used according to particular needs, desires, or particular implementations of the Computer 402 and the described functionality. While Memory 407 is illustrated as an integral component of the Computer 402, in some implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in some implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple Computers 402.

Described implementations of the subject matter can include one or more features, alone or in combination.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs executing on the respective computers and having a client-server relationship to each other.

The foregoing and other described implementations can each, optionally, include one or more of the following features:

For example, in a first implementation, a computer-implemented method, including: receiving a parameter set from a monitoring system, the parameter set including a plurality of configuration parameters corresponding to development artifacts detected by the monitoring system, retrieving statistical data from a central data analysis infrastructure, wherein the statistical data is retrieved from application systems executing software created out of the development artifacts, processing the parameter set using the statistical data to generate parameter clusters, and providing the parameter clusters to an integrated development environment to generate a test scope proposal based on the parameter clusters.

The foregoing and other described implementations can each, optionally, include one or more of the following features:

A first feature, combinable with any of the following features, wherein the parameter clusters include a portion of the parameter set that is smaller than a whole parameter set.

A second feature, combinable with any of the previous or following features, wherein the portion of the parameter set is selected based on a usage frequency indicated by the statistical data.

A third feature, combinable with any of the previous or following features, further including receiving from the monitoring system an incident report associated with the parameter set, the incident report providing a description of the development artifacts.

A fourth feature, combinable with any of the previous or following features, wherein the development artifacts include artifact definitions, attributes and information about artifact dependencies.

A fifth feature, combinable with any of the previous or following features, wherein the parameter set is determined by an application program interface for a first test of code coverage.

A sixth feature, combinable with any of the previous or following features, wherein an identification of the parameter set is received by the monitoring system from a test unit.

In a second implementation, a non-transitory computer-readable storage medium coupled to one or more processors and having instructions stored thereon which, when executed by the one or more processors, cause the one or more processors to perform operations for test optimization, the operations including: receiving a parameter set from a monitoring system, the parameter set including a plurality of configuration parameters corresponding to development artifacts detected by the monitoring system, retrieving statistical data from a central data analysis infrastructure, wherein the statistical data is retrieved from application systems executing software created out of the development artifacts, processing the parameter set using the statistical data to generate parameter clusters, and providing the parameter clusters to an integrated development environment to generate a test scope proposal based on the parameter clusters.

The foregoing and other described implementations can each, optionally, include one or more of the following features:

A first feature, combinable with any of the following features, wherein the parameter clusters include a portion of the parameter set that is smaller than a whole parameter set.

A second feature, combinable with any of the previous or following features, wherein the portion of the parameter set is selected based on a usage frequency indicated by the statistical data.

A third feature, combinable with any of the previous or following features, further including receiving from the monitoring system an incident report associated with the parameter set, the incident report providing a description of the development artifacts.

A fourth feature, combinable with any of the previous or following features, wherein the development artifacts include artifact definitions, attributes and information about artifact dependencies.

A fifth feature, combinable with any of the previous or following features, wherein the parameter set is determined by an application program interface for a first test of code coverage.

A sixth feature, combinable with any of the previous or following features, wherein an identification of the parameter set is received by the monitoring system from a test unit.

In a third implementation, a computer-implemented system, including: a client-side computing device, and a computer-readable storage device coupled to the client-side computing device and having instructions stored thereon which, when executed by the client-side computing device, cause the client-side computing device to perform operations for test optimization. The operations include: receiving a parameter set from a monitoring system, the parameter set including a plurality of configuration parameters corresponding to development artifacts detected by the monitoring system, retrieving statistical data from a central data analysis infrastructure, wherein the statistical data is retrieved from application systems executing software created out of the development artifacts, processing the parameter set using the statistical data to generate parameter clusters, and providing the parameter clusters to an integrated development environment to generate a test scope proposal based on the parameter clusters.

The foregoing and other described implementations can each, optionally, include one or more of the following features:

A first feature, combinable with any of the following features, wherein the parameter clusters include a portion of the parameter set that is smaller than a whole parameter set.

A second feature, combinable with any of the previous or following features, wherein the portion of the parameter set is selected based on a usage frequency indicated by the statistical data.

A third feature, combinable with any of the previous or following features, further including receiving from the monitoring system an incident report associated with the parameter set, the incident report providing a description of the development artifacts.

A fourth feature, combinable with any of the previous or following features, wherein the development artifacts include artifact definitions, attributes and information about artifact dependencies.

A fifth feature, combinable with any of the previous or following features, wherein the parameter set is determined by an application program interface for a first test of code coverage.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs executing on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for test optimization, comprising:
    receiving, by one or more processors, a parameter set from a monitoring system, the parameter set comprising a plurality of configuration parameters corresponding to development artifacts detected by the monitoring system, wherein the parameter set is determined by an application program interface for a first test of code coverage;
    retrieving, by the one or more processors, statistical data from a central data analysis infrastructure, wherein the statistical data is retrieved from application systems executing software created out of the development artifacts;
    processing, by the one or more processors, the parameter set using the statistical data to generate parameter clusters; and
    providing, by the one or more processors, the parameter clusters to an integrated development environment to generate a test scope proposal based on the parameter clusters.

2. The computer-implemented method of claim 1, wherein the parameter clusters comprise a portion of the parameter set that is smaller than a whole parameter set.

3. The computer-implemented method of claim 2, wherein the portion of the parameter set is selected based on a usage frequency indicated by the statistical data.

4. The computer-implemented method of claim 1, further comprising receiving from the monitoring system an incident report associated with the parameter set, the incident report providing a description of the development artifacts.

5. The computer-implemented method of claim 1, wherein the development artifacts comprise artifact definitions, attributes and information about artifact dependencies.

6. The computer-implemented method of claim 1, wherein an identification of the parameter set is received by the monitoring system from a test unit.

7. A non-transitory computer-readable storage medium coupled to one or more processors and having instructions stored thereon which, when executed by the one or more processors, cause the one or more processors to perform operations for test optimization, the operations comprising:
    receiving a parameter set from a monitoring system, the parameter set comprising a plurality of configuration parameters corresponding to development artifacts detected by the monitoring system, wherein the parameter set is determined by an application program interface for a first test of code coverage;
    retrieving statistical data from a central data analysis infrastructure, wherein the statistical data is retrieved from application systems executing software created out of the development artifacts;
    processing the parameter set using the statistical data to generate parameter clusters; and
    providing the parameter clusters to an integrated development environment to generate a test scope proposal based on the parameter clusters.

8. The non-transitory computer-readable storage medium of claim 7, wherein the parameter clusters comprise a portion of the parameter set that is smaller than a whole parameter set.

9. The non-transitory computer-readable storage medium of claim 8, wherein the portion of the parameter set is selected based on a usage frequency indicated by the statistical data.

10. The non-transitory computer-readable storage medium of claim 7, further comprising receiving from the monitoring system an incident report associated with the parameter set, the incident report providing a description of the development artifacts.

11. The non-transitory computer-readable storage medium of claim 7, wherein the development artifacts comprise artifact definitions, attributes and information about artifact dependencies.

12. The non-transitory computer-readable storage medium of claim 7, wherein an identification of the parameter set is received by the monitoring system from a test unit.

13. A computer-implemented system, comprising:
    a client-side computing device; and
    a computer-readable storage device coupled to the client-side computing device and having instructions stored thereon which, when executed by the client-side computing device, cause the client-side computing device to perform operations for test optimization, the operations comprising:
    receiving a parameter set from a monitoring system, the parameter set comprising a plurality of configuration parameters corresponding to development artifacts detected by the monitoring system, wherein the parameter set is determined by an application program interface for a first test of code coverage;
    retrieving statistical data from a central data analysis infrastructure, wherein the statistical data is retrieved from application systems executing software created out of the development artifacts;

processing the parameter set using the statistical data to generate parameter clusters; and providing the parameter clusters to an integrated development environment to generate a test scope proposal based on the parameter clusters.

14. The computer-implemented system of claim 13, wherein the parameter clusters comprise a portion of the parameter set that is smaller than a whole parameter set.

15. The computer-implemented system of claim 14, wherein the portion of the parameter set is selected based on a usage frequency indicated by the statistical data.

16. The computer-implemented system of claim 13, further comprising receiving from the monitoring system an incident report associated with the parameter set, the incident report providing a description of the development artifacts.

17. The computer-implemented system of claim 13, wherein the development artifacts comprise artifact definitions, attributes and information about artifact dependencies.

* * * * *